(12) United States Patent
Li et al.

(10) Patent No.: US 9,928,426 B1
(45) Date of Patent: Mar. 27, 2018

(54) VEHICLE DETECTION, TRACKING AND LOCALIZATION BASED ON ENHANCED ANTI-PERSPECTIVE TRANSFORMATION

(71) Applicant: Hong Kong Applied Science and Technology Research Institute Company Limited, Hong Kong (CN)

(72) Inventors: Hailiang Li, Hong Kong (CN); Zhi Bin Lei, Hong Kong (CN); Yang Liu, Hong Kong (CN); Man Yau Chiu, Hong Kong (CN); Kangheng Wu, Hong Kong (CN)

(73) Assignee: HONG KONG APPLIED SCIENCE AND TECHNOLOGY RESEARCH INSTITUTE COMPANY LIMITED, Shatin (HK)

(*) Notice: Subject to any disclaimer, the term of this patent is extended or adjusted under 35 U.S.C. 154(b) by 26 days.

(21) Appl. No.: 15/267,875

(22) Filed: Sep. 16, 2016

(51) Int. Cl.
*G06K 9/46* (2006.01)
*G06K 9/00* (2006.01)
*G06K 9/32* (2006.01)

(52) U.S. Cl.
CPC ..... *G06K 9/00785* (2013.01); *G06K 9/00771* (2013.01); *G06K 9/325* (2013.01)

(58) Field of Classification Search
CPC .......................................... G06T 3/40–3/4092
See application file for complete search history.

(56) References Cited

U.S. PATENT DOCUMENTS 8,760,472 B2   6/2014  Abbas ........................... 345/644
9,165,361 B1 *  10/2015  Ely ........................... G06T 3/00
(Continued)

FOREIGN PATENT DOCUMENTS

| CN | 102254318 A | 11/2011 |
|---|---|---|
| CN | 102902945 A | 1/2013 |
| EP | 2 750 081 A1 | 7/2014 |

OTHER PUBLICATIONS

Written Opinion of the International Searching Authority dated Apr. 25, 2017, issued by the International Property Office.

*Primary Examiner* — Bobbak Safaipour
(74) *Attorney, Agent, or Firm* — Stein IP, LLC

(57) ABSTRACT

A method for a vehicle management system with a perspective view camera generating perspective images of vehicles in a traffic direction, including performing an anti-perspective transform on the perspective images; separating each anti-perspective image into sub-images along one of a radial direction and a tangential direction relative to the traffic direction; determining a scale factor for each sub-image based upon measuring a scale of each vehicle at plural positions in one image using a frame difference method performing a scale transform for each sub-image using the corresponding scale factors for the sub-image; combining each of the scale transformed sub-images for each vehicle into corresponding enhanced anti-perspective images; performing vehicle detection for each vehicle based a combination of the enhanced anti-perspective images in which tracking is enhanced with an optimized detection box size range determined by the enhanced anti-perspective images; and performing vehicle tracking for each vehicle based on the combination of the enhanced anti-perspective images in which detecting is enhanced with the optimized detection box size range determined by the enhanced anti-perspective images.

17 Claims, 9 Drawing Sheets

(56) References Cited

U.S. PATENT DOCUMENTS

| | | | |
|---|---|---|---|
| 9,412,031 B2* | 8/2016 | Rodriguez-Serrano | G06K 9/3258 |
| 2006/0177099 A1* | 8/2006 | Zhu | G06K 9/00335 382/104 |
| 2008/0055114 A1* | 3/2008 | Kim | B60R 1/00 340/937 |
| 2012/0263383 A1* | 10/2012 | Otuka | G06K 9/00798 382/195 |
| 2013/0027196 A1* | 1/2013 | Yankun | G06K 9/00805 340/435 |
| 2013/0050492 A1 | 2/2013 | Lehning | 348/148 |
| 2015/0161457 A1* | 6/2015 | Hayakawa | G08G 1/166 348/46 |
| 2016/0019698 A1 | 1/2016 | Kalva et al. | |
| 2016/0379064 A1* | 12/2016 | Van Beek | G06K 9/00798 382/104 |
| 2017/0220877 A1* | 8/2017 | Kakegawa | G06K 9/00791 |
| 2017/0262712 A1* | 9/2017 | Chundrlik, Jr. | G06K 9/00798 |

* cited by examiner

US 9,928,426 B1

VEHICLE DETECTION, TRACKING AND LOCALIZATION BASED ON ENHANCED ANTI-PERSPECTIVE TRANSFORMATION

BACKGROUND OF THE INVENTION

Field of the Invention

Aspects of the present invention relate to traffic information, and in particular, vehicle detection, tracking and localization of a distorted object in a real time situation.

Description of the Related Art

Traffic video surveillance is an application of image acquisition through the use of a camera, transmission, control, display and other equipment and control software for fixed area monitoring, tracking and information processing traffic management information systems, including video transmission and video processing. Such surveillance based on peer-to-peer (P2P) transmission is being considered an important aspect in modern smart city planning. The P2P network structure ensures the transmission efficiency and robustness.

Vehicle detection is the preparative operation for the application later, such as vehicle recognition or classification, and vehicle speed estimation. When capturing vehicles traveling on a highway, normally images are obtained in a perspective form, which may generate a distorted result for the vehicles. Distorted vehicle images will challenge subsequent detection, localization, and classification or recognition operations. In order to detect distorted vehicle images in a perspective view, it is necessary to train a detector detecting a warped vehicle image to detect profile faces while a lot of training samples on profile faces should be collected, which may cause the detector to be bigger and more complex than the current ones.

The detection efficiency is another issue to deal with since the size of each vehicle changes in relation to the image perspective. This can/will create misclassification during the vehicle detection or tracking process. Noting that vehicle tracking is a critical operation for vehicle counting and other operations, an object tracking algorithm results in the generation of a large scalable problem, such as a vehicle appearing to be more than ten times its actual size when traveling past a camera.

Most recently, it is a common method to capture a target vehicle's license plate by using the camera for identification purposes, especially at a vehicle's entry or exit point to a highway, parking lot or other location. In this situation, the target vehicle is usually moving at a low speed such that the captured image is clear enough for identification and checking. In another situation, it is a difficult task to recognize the figures (such as the numerals and letters) on a vehicle's license plate on the highway where vehicles move at high speeds, particularly with relatively small vehicle size. The captured images, whether video or distinct still images (collectively called images), taken by the camera over the highway, tends to become either small or blurred. Thus, it is difficult to see the video or still images accurately.

SUMMARY OF THE INVENTION

Embodiments of the present invention have been made to solve the above and/or other problems, and an exemplary aspect of the invention is to normalize the shape and size of a vehicle wherever it is in the camera view, and to transform the camera image into an enhanced anti-perspective domain to achieve real time detection with robust tracking performance.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

According to the embodiments of the invention, it is possible to perform detection or tracking of vehicles on highways, traveling at normal highway speeds, even when the issue of distorted objects effects arises.

Figure 1:
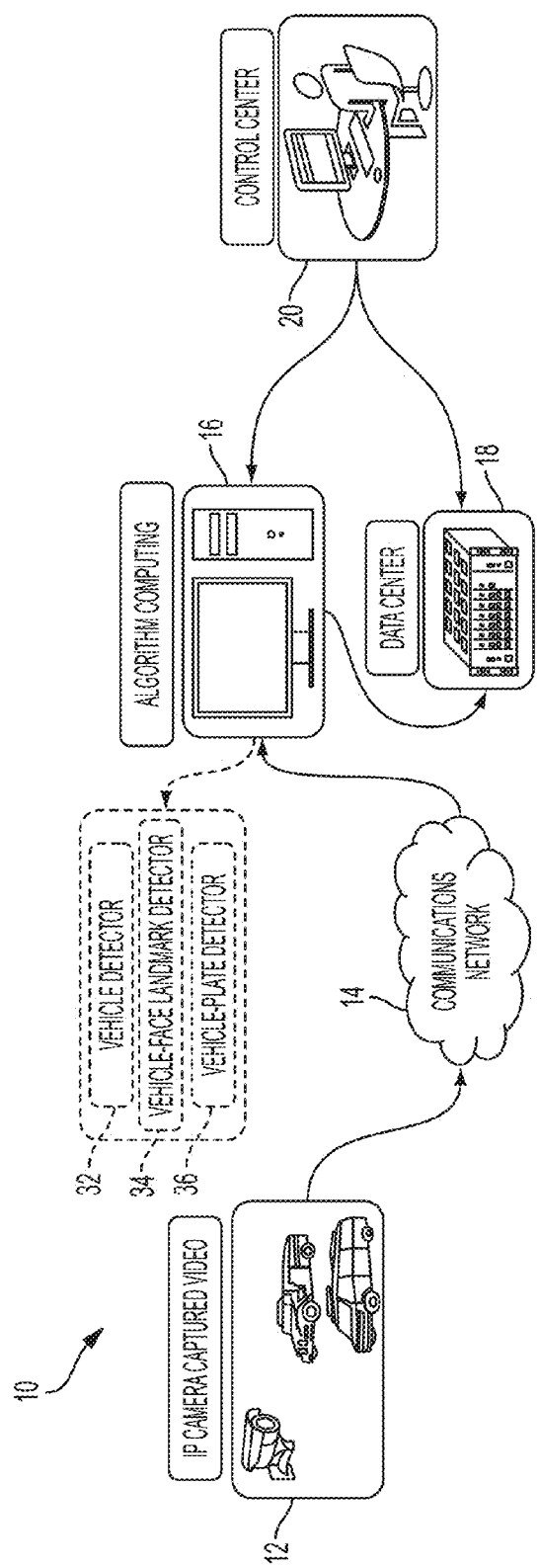
FIG. 1 is a diagram of an intelligent traffic surveillance system according to an embodiment.

FIG. 1 shows an intelligent traffic surveillance system 10 according to an embodiment to monitor vehicle traffic on roads, such as highways. An IP camera 12 captures video (which can be video or a series of still images) of vehicles traveling in a particular direction along a highway. The highway can have 1, 3, 6 or even more lanes, or any number of lanes in between. The IP camera 12 is connected to a communications network 14, such as an internet network or other type of linked network. Images (video) are sent to a processing center 16 through the communications network 14, where algorithms are performed, such a vehicle detection, vehicle-face landmark detection, vehicle-plate detection, and other algorithms, to be described later on in this specification. The processing center 16 may be a monitor and management center comprising one or more computers/computing devices. The processing center 16 is connected to a data center 18. A control center 20 is operated by individuals to control the intelligent surveillance system 10 and is connected to the processing center 16 and the data center 18.

A vehicle detector 32, a vehicle-face landmark detector 34, and a vehicle plate detector 36 are loaded onto the one or more computers of the processing center 16, to perform corresponding algorithms as described later in the specification.

In an embodiment, code having a set of instructions for performing the operations of the vehicle detector 32, the vehicle-face landmark detector 34, the vehicle plate detector 36, or any other device performing the above-described algorithms may be stored on a non-transitory computer readable medium usable with any compatible hardware element. These elements comprise various units, including an anti-perspective transform unit, a scale factor determining unit, an enhanced anti-perspective transformation unit, a vehicle detector, a vehicle tracker, a vehicle localizer, and a color recognizer.

Figure 2:
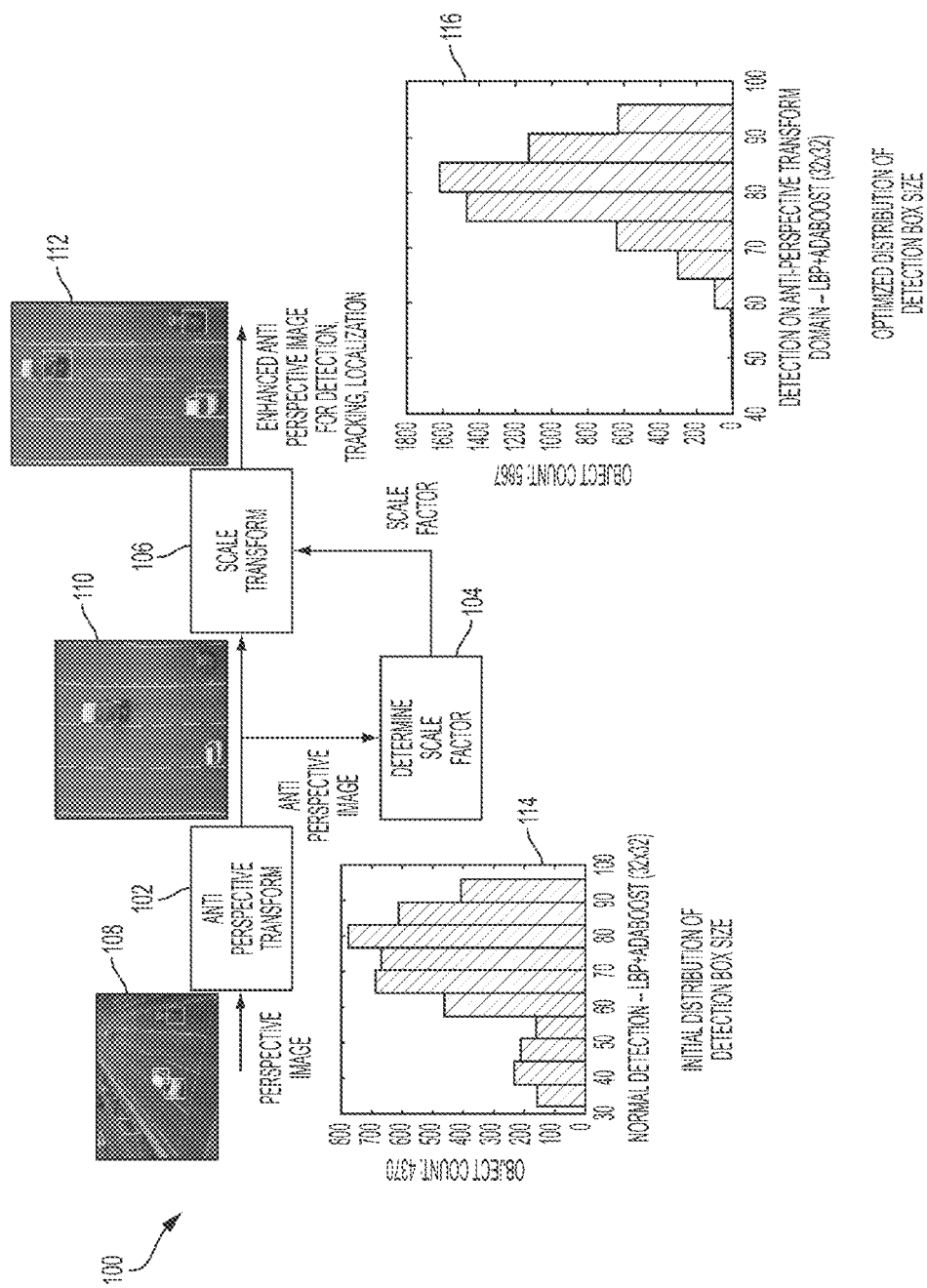
FIG. 2 is a flowchart of an illustrating an embodiment of a method to generate enhanced anti-perspective images for vehicle detection, tracking and localization.

FIG. 2 is a flowchart of a method to generate an enhanced anti-perspective image for vehicle detection, tracking and localization. Referring to FIG. 2, a method 100 of transforming a perspective image 108 to an enhanced anti-perspective image 112 of the video can be performed in the processing center 16 according to three main operations, namely "Operation 102: Anti-perspective Transform", "Operation 104: Determine Scale Factor" and "Operation 106: Scale Transform". As shown in an optimized distribution of a detection box size 116, the noise in an initial distribution of the detection box size 114 can be reduced. As is shown in FIG. 2, the vehicle detector 32 (which is the same as a face detector in traditional face detection) can detect vehicles among the many different possible vehicle sizes (i.e., different bounding box sizes of the detected vehicles) which is with a distribution (e.g., from 24~120 pixel size). After the anti-perspective transform 102, the vehicle detector 32 detects vehicles in an anti-perspective (transform) image 110 in a relatively narrow range, (e.g., from 60~110 pixel size), which means the distribution of the size range is narrowed to half. Based on the distribution of the size range, it is possible to set an optimal detection range, which may speed up the detection more than two (2) times, (e.g., from 14.86 frames/second to 31.64 frames/second). The detection size range setting and size distribution obtaining is a chicken-egg situation, so in the beginning, (i.e., in the beginning on getting the first 500 samples of detected car sizes, a relatively larger range is set, e.g., 20~150 pixel size. Once 500 samples are obtained, based on the distribution on these 500 samples, it is possible to get the new (relatively narrow) range, e.g., 60~110 pixel size. Then, a conservative estimate range can be set to 55~115 (60−5, 110+5) pixel size. Based on the new range, new samples can be collected, and then the range can be updated by new samples.

For operation 102 in FIG. 2, for the images of the video, an anti-perspective transform is a combination of a 2D scale, a rotation, and a translation transformation which can be described as:

$$\begin{pmatrix} x \\ y \\ w \end{pmatrix} = \begin{pmatrix} a & b & c \\ d & e & f \\ g & h & i \end{pmatrix} \begin{pmatrix} u \\ v \\ q \end{pmatrix}$$

Here the matrix coefficients can be separated as four parts.

$$\begin{pmatrix} a & b \\ d & e \end{pmatrix}$$

is used for linear transformation, such as scaling, shearing and rotation. [g h] is employed for translation and $[c\ f]^T$ is employed to generate a perspective transform.

If w≠1, then q=1 can be chosen. The general form of a projective mapping is a rational linear mapping:

$$x = \frac{au + bv + c}{gu + hv + i} \quad y = \frac{du + ev + f}{gu + hv + i}$$

Begin with a correspondence map $(u_k; v_k)^T$ to $(x_k; y_k)^T$ for vertices numbered cyclically k=0; 1; 2; 3. All coordinates are assumed to be real (finite). To compute the forward mapping matrix, assuming that i=1, eight equations in the eight unknowns a-h can be generated:

$$x_k = \frac{au_k + bv_k + c}{gu_k + hv_k + 1} \Rightarrow au_k + bv_k + c - gu_k x_k - hv_k x_k = x_k$$

$$y_k = \frac{du_k + ev_k + f}{gu_k + hv_k + 1} \Rightarrow du_k + ev_k + f - gu_k y_k - hv_k y_k = y_k$$

for k=0; 1; 2; 3. This can be rewritten as an 8×8 system:

$$\begin{pmatrix} u_0 & v_0 & 1 & 0 & 0 & 0 & -u_0 x_0 & -v_0 x_0 \\ u_1 & v_1 & 1 & 0 & 0 & 0 & -u_1 x_1 & -v_1 x_1 \\ u_2 & v_2 & 1 & 0 & 0 & 0 & -u_2 x_2 & -v_2 x_2 \\ u_3 & v_3 & 1 & 0 & 0 & 0 & -u_3 x_3 & -v_3 x_3 \\ 0 & 0 & 0 & u_0 & v_0 & 1 & -u_0 y_0 & -v_0 y_0 \\ 0 & 0 & 0 & u_1 & v_1 & 1 & -u_1 y_1 & -v_1 y_1 \\ 0 & 0 & 0 & u_2 & v_2 & 1 & -u_2 y_2 & -v_2 y_2 \\ 0 & 0 & 0 & u_3 & v_3 & 1 & -u_3 y_3 & -v_3 y_3 \end{pmatrix} \begin{pmatrix} a \\ b \\ c \\ d \\ e \\ f \\ g \\ h \end{pmatrix} = \begin{pmatrix} x_0 \\ x_1 \\ x_2 \\ x_3 \\ y_0 \\ y_1 \\ y_2 \\ y_3 \end{pmatrix}.$$

This linear system can be solved using Gaussian elimination or other methods for the forward mapping coefficients a-h.

Figure 3:
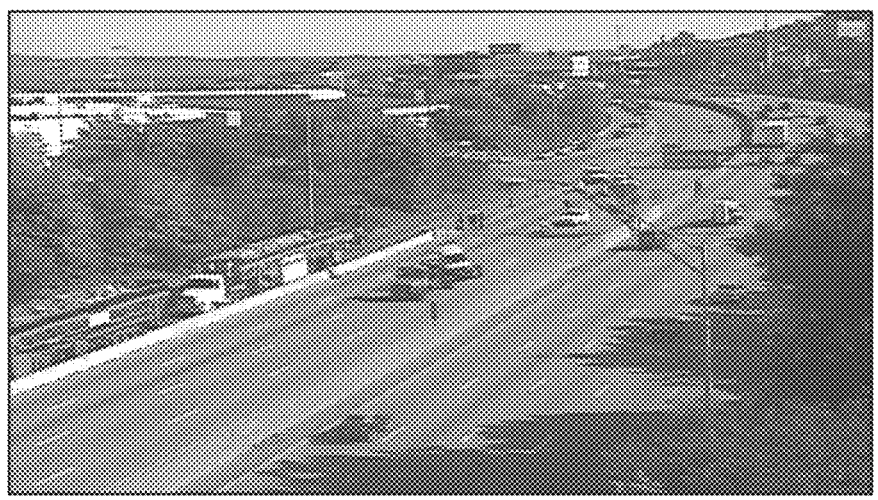
FIG. 3 is a perspective view of an image from a camera of traffic flow on a highway.
Figure 4:
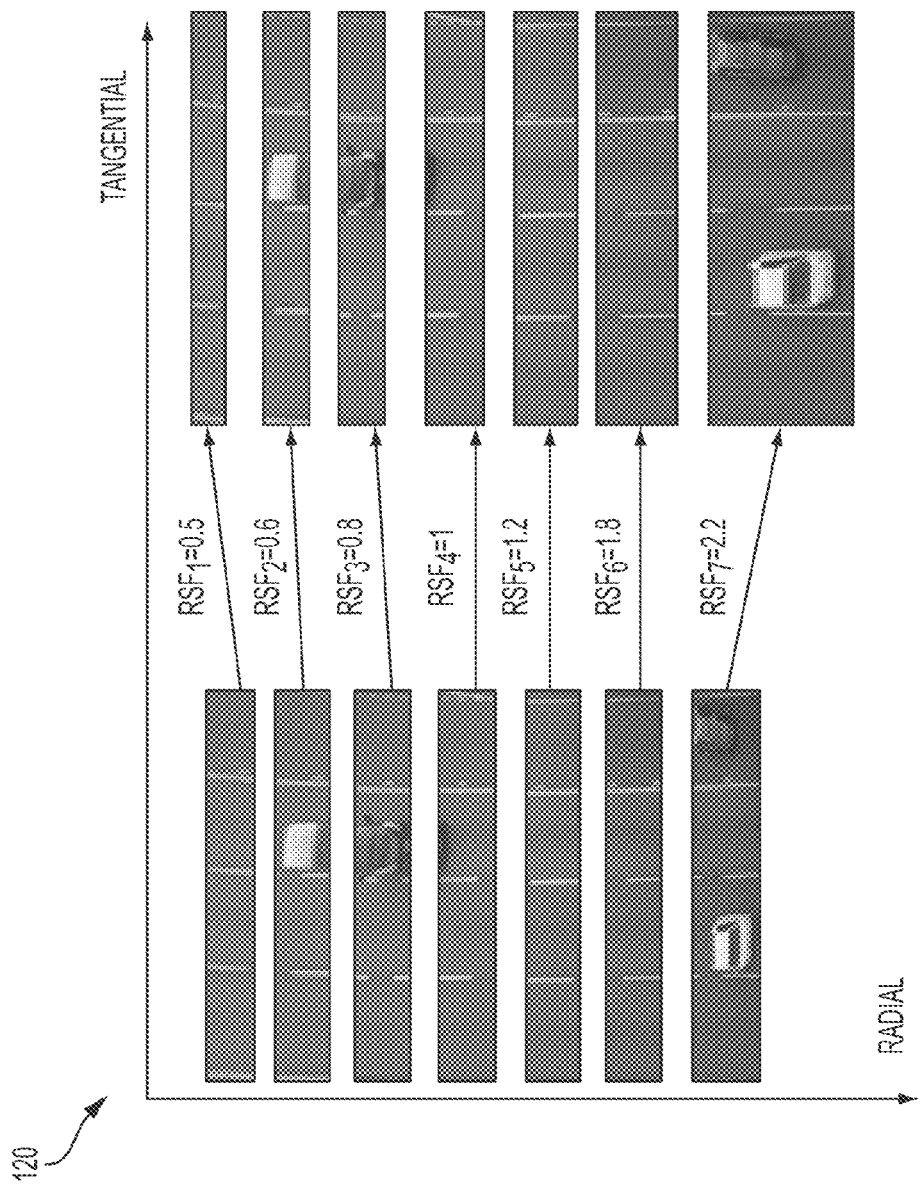
FIG. 4 is a view illustrating an embodiment of a method for scale transform.

For operation 104 in FIG. 2, the determination of a scale factor (SF) includes a radial scale factor (RSF) and a tangential scale factor (TSF) relative to the traffic direction. In this example, only RSF is used since the camera 12 is installed on the radial direction of traffic flow. If the camera is not installed on the radial or tangential direction of traffic flow (but a perspective direction), as shown in FIG. 3, both RSF and TSF should be used. The methods to calculate RSF and TSF are the same, but are provided the corresponding directions. FIG. 4 illustrates a method for RSF calculation. RSF and TSF are calculated independently. They can be set by experience or by calculation. The scale factor calculation is based on the anti-perspective transform 102 output, which is the anti-perspective image 110.

The anti-perspective image 110, after the anti-perspective transform 102, is divided into n parts ($P_1, P_2 \ldots P_3$. When n is an even number, $RSF_{n/2-1}=1$. When n is an odd number, $RSF_{(n+1)/2}=1$. The size of n parts can equal each other or not.

For operation 106 in FIG. 2, the scale transform 106 receives the anti-perspective image 110 and outputs the enhanced anti perspective image 112, and the scale transform 106 includes the radial scale transform and the tangential scale transform according to the vehicle shooting direction. The methods to perform the radial scale transform and the tangential scale transform are the same as noted above. For each sub-image Pi, (I=1 . . . , 7 in this example), Pi is extended in the radial direction by $RSF_i$. In this case, no tangential scale transform is used (i.e., $TSF_i=1$ 1 for i=1 . . . , 7)

FIG. 4 illustrates a method 120 for the scale transform. Referring to FIG. 4, since the traffic direction in the example is only radial, RSF will be used for illustration in the following descriptions. The image after the anti-perspective transform operation 102 is divided into n parts ($P_1, P_2 \ldots P_n$). When n is an even number, $RSF_{n/2-1}=1$, and when n is an odd number, $RSF_{(n+1)/2}=1$. The size of n parts can be equal to each other or not RSF of the middle strip is always set to 1. But for the other parts, the RSF values are different from 1 according to the calculations (as shown in our current example) or according to manual configurations based on experience.

Take the frame difference result when there is only one object moving in the vehicle view. The vehicle (object) length $L_i$ is defined by the object length measured by pixels when the rear of the object is inside Pi. If n is an even number, when $n+1>i>n/2$, $RSF_i=L_i/L_{n/2-1}$, and when $n/2>i>0$, $RSF_i=L_{n/2-1}/L_i$. If n is an odd number, when $n+1>i>(n+1)/2$, $RSF_i=L_i/L_{(n+1)/2}$, and when $(n+1)/2>i>0$, $RSF_i=L_{n+1/2}/L_i$. In this example, as shown in FIG. 4, $RSF_1$ is equal to 0.5; $RSF_2$ is equal to 0.6; $RSF_3$ is equal to 0.8; $RSF_4$ is equal to 1; $RSF_5$ is equal to 1.2; $RSF_6$ is equal to 1.8; and $RSF_7$ is equal to 2.2. For each sub-image $P_i$, (i=1 . . . , 7 in this example), $P_i$ is extended in the radial direction by $RSF_i$. In this example, no tangential scale transform is used (i.e., $TSF_i=1$ for i=1, . . . , 7).

Figure 5:
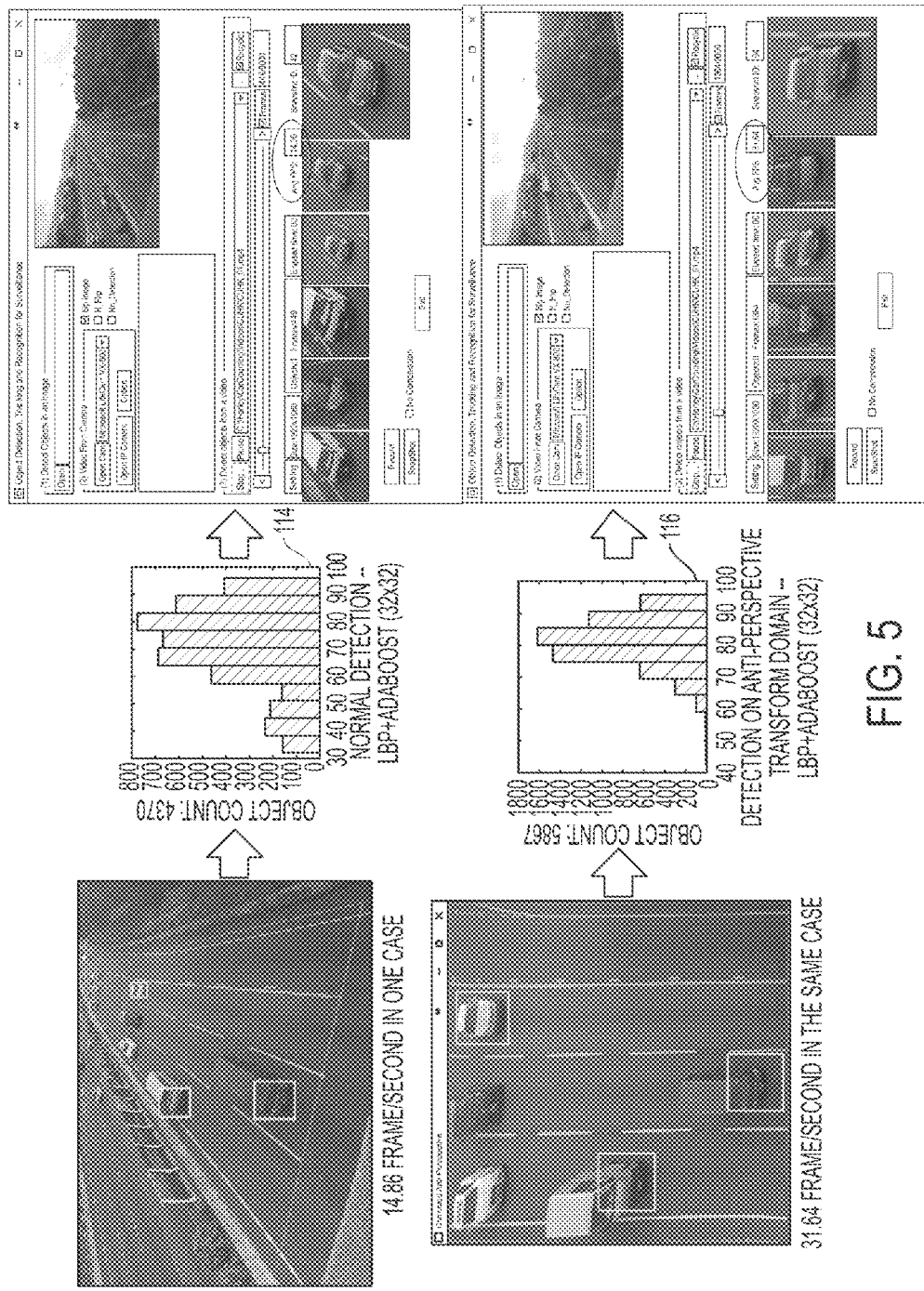
FIG. 5 illustrates the benefit generating enhanced anti-perspective images for detection of vehicles on the highway.

FIG. 5 illustrates a benefit of generating enhanced anti-perspective images for detection of vehicles on the highway. As can be seen in the optimized distribution of a detection box size 116 (see FIGS. 2 and 5) can be narrowed to half of an original range, the noise in an initial distribution of the detection box size 114 can be reduced.

Figure 6:
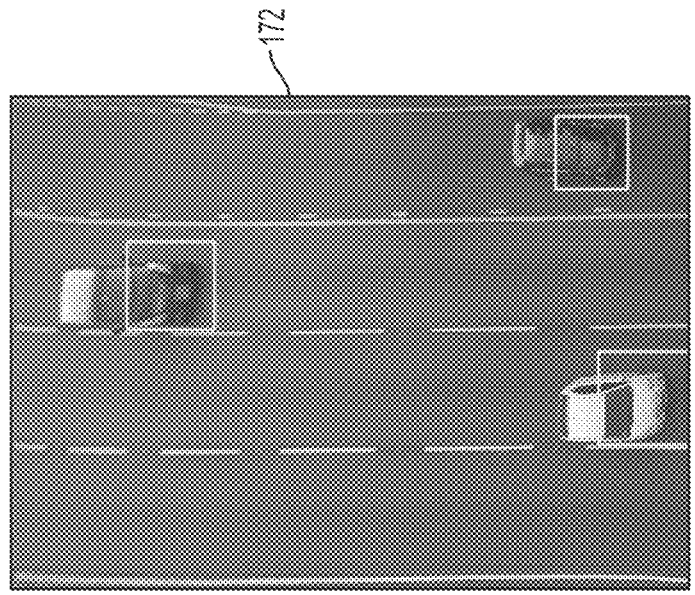
FIG. 6 illustrates the benefit of generating enhanced anti-perspective images for tracking of vehicles on the highway.
Figure 6:
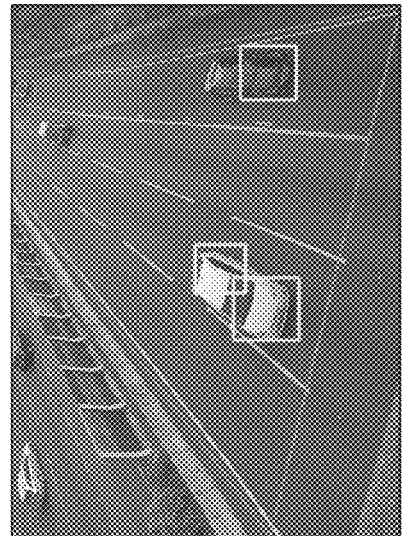

FIG. 6 illustrates a benefit of generating enhanced anti-perspective images 172 from original perspective images 170 for tracking of vehicles on the highway. With increased tracking time, more chances of recognition of the vehicle type and details become available.

Figures 7A, 7B:
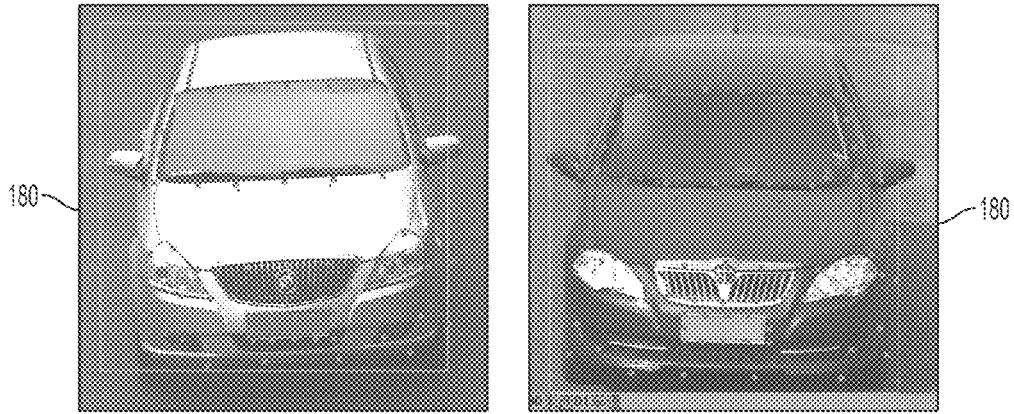
FIGS. 7a-7b illustrate an example of vehicle recognition by using a landmark localization method.

FIGS. 7a-7b illustrate an example of vehicle recognition by using a landmark localization method based upon input from the vehicle-face landmark detector 34 in which the features of the detection object will be extracted for analysis. Referring to FIGS. 7a-7b, aided by the landmark localization method, features, such as a vehicle's license plate 180 and a vehicle's nameplate position based upon input from the vehicle-face landmark detector 34 can be extracted in a more accurate way. This approach can assist with the vehicle recognition process as described in the following paragraph.

Figure 8:
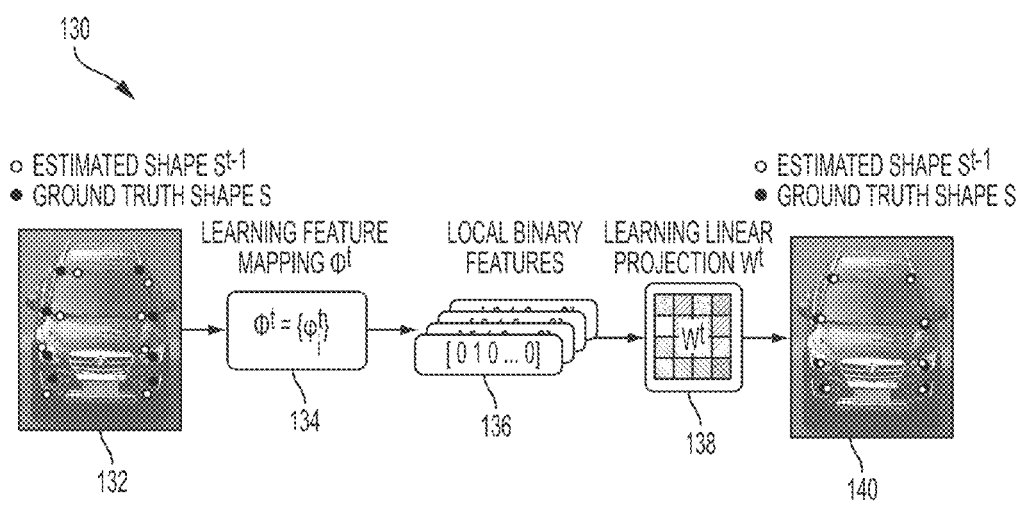
FIG. 8 illustrates an embodiment of a method for landmark localization of a vehicle by using a feature mapping function and a linear projection.
Figure 9:
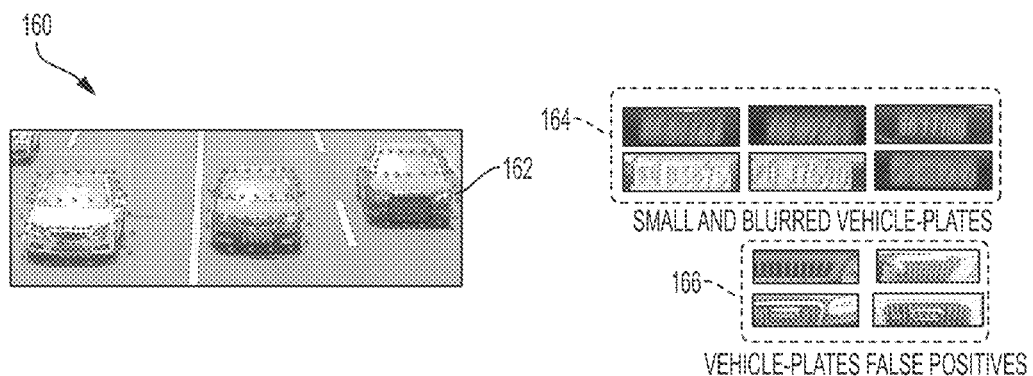
FIG. 9 illustrates an example of locating license plates of vehicles on a highway by using the landmark localization method.

FIG. 8 illustrates an embodiment of a method for landmark localization 130 of a vehicle by using a feature mapping function and a linear projection. Mainly due to the perspective image 108, the current detection and localization algorithms have difficulty handling heavy deformations. Once the image 108 of the vehicle is transformed an into anti-perspective image, some fast localization methods, such as a random forests based regression algorithm with local features can work efficiently on vehicle landmark localization, which may simplify vehicle classification or recognition in later stages. Referring to FIG. 8, given a vehicle image I, there is a ground truth shape S 130 corresponding to this vehicle image. t forests are trained (with several binary trees) to get a feature mapping function $\varphi^t(I,S^{t-1})$ 132 for each tree to generate local features 134. Here t also means that t stages are trained, and n forests are trained (here n forests are equal to n experts) in each stage. The error of the last stage $\Delta S^t$ is calculated from ground truth and previous stage estimated shape $S^{t-1}$, and also defined as the target shape increments $\{\Delta S^t=S-S^{t-1}\}$. The shape error $\Delta S$ is relative to shape-indexed features. The shape-indexed features are used for construction of a binary tree and then local features are generated from the leaves of a binary. A linear projection matrix $W^t$ 136 is trained to get the feature mapping between the local binary feature and shape error $\Delta S$ by linear regression. The learned linear projection (regression) matrix $W^t$ is described as the visualized matrix (element 138) in FIG. 8. All the elements in the visualized matrix are the learned weights from linear regression processing. From the visualized matrix, the estimated shape $S^{t-1}$ and ground truth shape S FIG. 9 illustrates an example 160 of locating license plates of vehicles in highway by using the landmark localization method to determine a vehicle plate localization area 162. It is a significant challenge to detect a vehicle's license plate where the vehicles are on a highway moving at normal speeds and a camera captures images of the vehicles across more than six lanes. Besides, it is a time consuming process to locate small and blurred vehicles' license plates 164 in large images. In light of the landmark localization 130 as shown in FIG. 8, the computation time can be reduced to 1/10 of that in prior art methods. On the other hand, creating a false positive 166 is another challenge in the process of locating vehicles' license plates. For instance, a vehicle's fan is near the vehicle's license plate and therefore may trigger the false positive 166. Therefore, the landmark localization for the vehicle's license plate area can give a more robust criterion for locating the vehicle's license plate, which means among all the detected potential objects, the one which is closer to the landmark localized area will be the best one.

Figure 10:
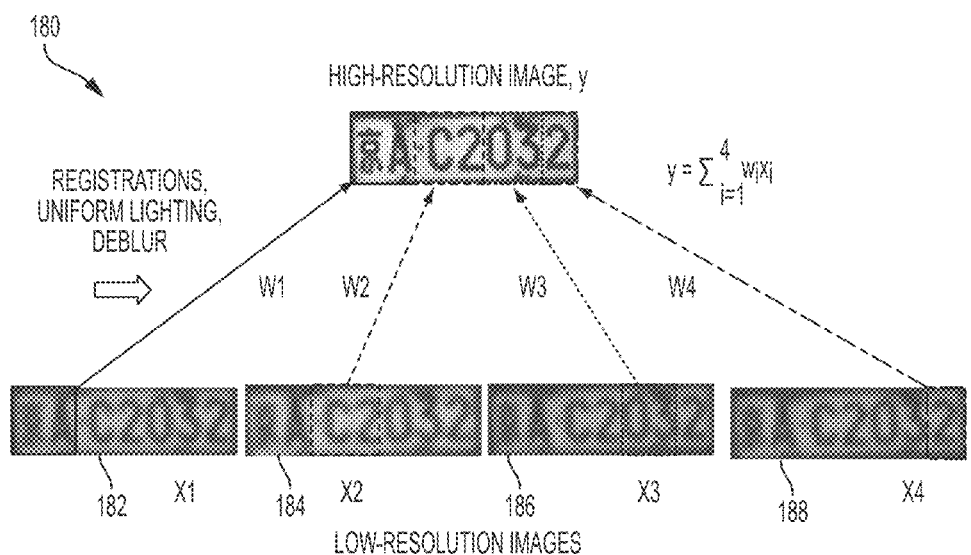
FIG. 10 is a view illustrating an embodiment of a method for generative model of super-resolution in the identification of a vehicle's license plate.

FIG. 10 illustrates a method 180 for a generative model of super-resolution in the identification of a vehicle's license plate. In an anti-perspective domain, the objects, such as vehicle license plates, can be determined quickly and normalized into a similar size, which is helpful for object registration for later vehicle license plate image super-resolution. Given that a number of low-resolution images can differ in geometric transformations, lighting (photometric) transformations, camera blur (point-spread function) and image quantization and noise, it is still possible to generate an estimated high-resolution vehicle license plate, which can be used for identification and other purposes.

Referring to FIG. 10, for the purpose of illustration, assuming a vehicle's license plate can be separated into four sections, the low resolution image $x_1$ 182 can be treated by an image processing method $w_1$, for example, registrations, uniform lighting, deburr, etc. The same holds true for the low resolution image $x_2$ 184 which can be treated by an image processing method $w_2$, the low resolution image $x_3$ 186 can be treated by an image processing method $w_3$, and the low resolution image $x_4$ 188 can be treated by an image processing method $w_2$. Then, the high resolution image y can be generated by $\Sigma_{i=1}^{4} w_i x_i$.

Figure 11:
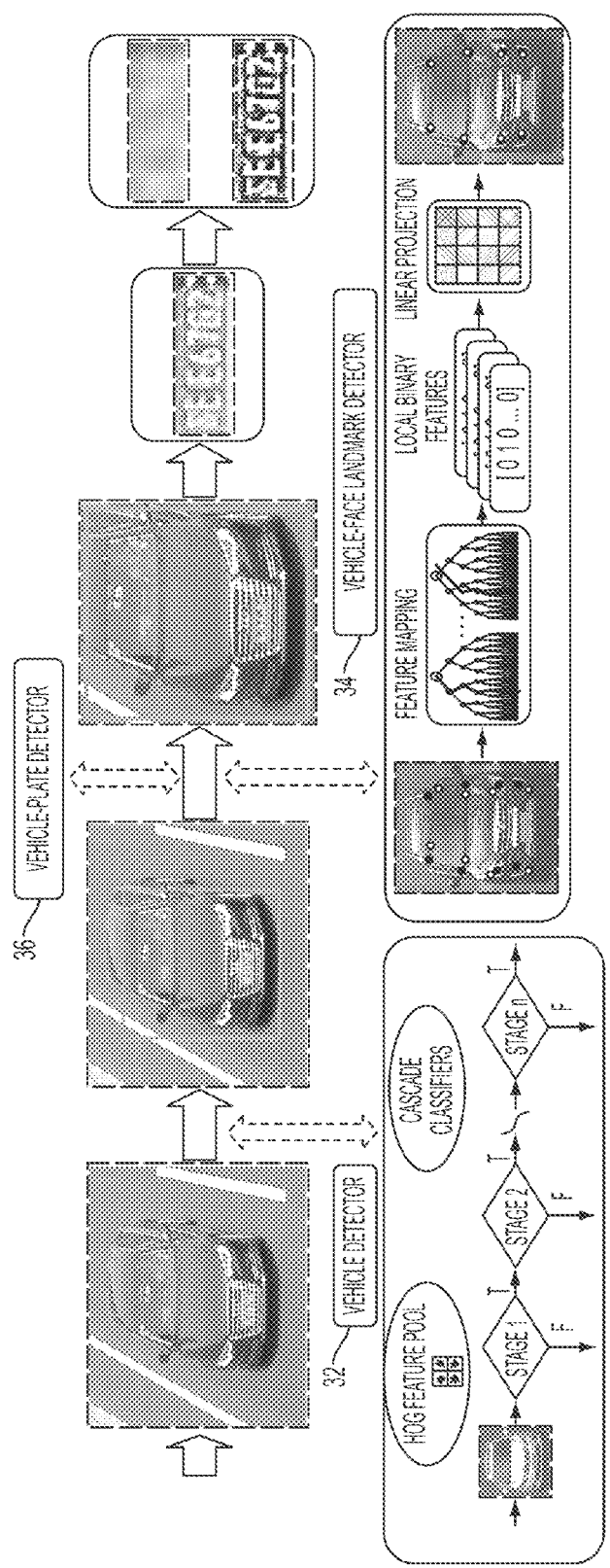
FIG. 11 shows a two stage scheme based on a vehicle plate detection and a vehicle-plate color extraction algorithm.

FIG. 11 shows a two stage scheme based on a vehicle plate detection and a vehicle-plate color extraction algorithm. 1: Input: a captured video frame image (1920×1080 RGB) from the traffic surveillance system, an Adaboost+ HOG trained vehicle detector $D_{vehicle}$ 32, also an Adaboost+ HOG trained vehicle-plate detector $D_{vehicle-plate}$ 36, a random forests trained vehicle face landmark localizer $L_{vehicle-face}$; 2: For each input image, the vehicle detector $D_{vehicle}$ 32 is employed to detect any potential vehicles in the image; 3: For each detected vehicle, the vehicle-plate detector $D_{vehicle-plate}$ 36 is used to detect any potential vehicle-plates in the bottom half part of vehicle area since it is with high probability that a vehicle-plate is located there; 4: For each detected vehicle, a vehicle face landmark localizer $L_{vehicle-face}$ is able to extract the landmark points, in which the potential vehicle-plate position can be obtained; 5: Compare all the vehicle-plate candidates obtained by the vehicle-plate detector $D_{vehicle-plate}$ 36, the one which obtains the max value of an overlapping area will be the most approximated one; 6: For the extracted blurred vehicle-plate, a cartoon texture decomposition algorithm is used to extract the cartoon part, in which we can extract the RGB color histogram to determine the color type by a trained SVM classifier; and 7: Output: the color type of an extracted blurred vehicle-plate.

As a result, of the foregoing system and algorithms, vehicle detection, tracking and localization are improved, particularly in environments where vehicles are high in volume and traveling at high speeds, such as on a highway.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for a vehicle management system with a perspective view camera generating perspective images of vehicles in a traffic direction, comprising:
    performing an anti-perspective transform on the perspective images;
    separating each anti-perspective image into sub-images along one of a radial direction and a tangential direction relative to the traffic direction;
    determining a scale factor for each sub-image based upon measuring a scale of each vehicle at plural positions in one image using a frame difference method performing a scale transform for each sub-image using the corresponding scale factors for the sub-image;
    combining each of the scale transformed sub-images for each vehicle into corresponding enhanced anti-perspective images;
    performing vehicle detection for each vehicle based a combination of the enhanced anti-perspective images in which detection is enhanced with an optimized detection box size range determined by the enhanced anti-perspective images; and
    performing vehicle tracking for each vehicle based on the combination of the enhanced anti-perspective images in which detection is enhanced with the optimized detection box size range determined by the enhanced anti-perspective images.

2. The method of claim 1, further comprising;
    performing vehicle localization for each vehicle by integrating each of the detected and/or tracked results from a same one of the vehicles.

3. The method of claim 1, further comprising:
    performing landmark localization to localize a vehicle plate area for each vehicle based upon at least one of the detected and tracked results; and
    locating a vehicle license plate around the localized plate area of each vehicle based upon the landmark localization.

4. The method of claim 2, further comprising:
    performing landmark localization to localize a vehicle plate area for each vehicle based upon at least one of the detected and tracked results; and
    locating a vehicle license plate around the localized plate area of each vehicle based upon the landmark localization.

5. The method of claim 3, further comprising generating higher resolution images based on images of the located vehicle license plates.

6. The method of claim 4, further comprising generating higher resolution images based on images of the located vehicle license plates.

7. The method of claim 1, wherein the performing of the anti-perspective transform for the perspective images comprises:
    performing an anti-perspective transform which is a combination of a 2D scale, a rotation, and a translation transformation which is described as:

$$\begin{pmatrix} x \\ y \\ w \end{pmatrix} = \begin{pmatrix} a & b & c \\ d & e & f \\ g & h & i \end{pmatrix} \begin{pmatrix} u \\ v \\ q \end{pmatrix}$$

the matrix coefficients separated as four parts, $$\begin{pmatrix} a & b \\ d & e \end{pmatrix}$$

is used for linear transformation, including scaling, shearing and rotation; [g h] is employed for translation; and $[c\ f]^T$ is employed to generate a perspective transform
    wherein:
    if $w \neq 1$, then $q=1$ is chosen, a general form of a projective mapping is a rational linear mapping:

$$x = \frac{au + bv + c}{gu + hv + i} \quad y = \frac{du + ev + f}{gu + hv + i}$$

a correspondence map $(u_k; v_k)^T$ to $(x_k; y_k)^T$ is for vertices numbered cyclically $k=0; 1; 2; 3$;
all coordinates are assumed to be real;
to compute the forward mapping matrix, assuming that $i=1$, eight equations in the eight unknowns a-h are generated:

$$x_k = \frac{au_k + bv_k + c}{gu_k + hv_k + 1} \Rightarrow au_k + bv_k + c - gu_k x_k - hv_k x_k = x_k$$

$$y_k = \frac{du_k + ev_k + f}{gu_k + hv_k + 1} \Rightarrow du_k + ev_k + f - gu_k y_k - hv_k y_k = y_k$$

$$\begin{pmatrix} u_0 & v_0 & 1 & 0 & 0 & 0 & -u_0 x_0 & -v_0 x_0 \\ u_1 & v_1 & 1 & 0 & 0 & 0 & -u_1 x_1 & -v_1 x_1 \\ u_2 & v_2 & 1 & 0 & 0 & 0 & -u_2 x_2 & -v_2 x_2 \\ u_3 & v_3 & 1 & 0 & 0 & 0 & -u_3 x_3 & -v_3 x_3 \\ 0 & 0 & 0 & u_0 & v_0 & 1 & -u_0 y_0 & -v_0 y_0 \\ 0 & 0 & 0 & u_1 & v_1 & 1 & -u_1 y_1 & -v_1 y_1 \\ 0 & 0 & 0 & u_2 & v_2 & 1 & -u_2 y_2 & -v_2 y_2 \\ 0 & 0 & 0 & u_3 & v_3 & 1 & -u_3 y_3 & -v_3 y_3 \end{pmatrix} \begin{pmatrix} a \\ b \\ c \\ d \\ e \\ f \\ g \\ h \end{pmatrix} = \begin{pmatrix} x_0 \\ x_1 \\ x_2 \\ x_3 \\ y_0 \\ y_1 \\ y_2 \\ y_3 \end{pmatrix}$$

for $k=0; 1; 2; 3$, This can be rewritten as an 8×8 system:
    the linear system being solved using Gaussian elimination or other methods for the forward mapping coefficients a-h.

8. The method of claim 1, wherein the performing of the scale transform for each sub-image comprises:
- dividing each anti-perspective image into n parts ($P_1$, $P_2$ ... $P_n$); wherein when n is an even number, $RSF_{n/2-1}=1$, and when n is an odd number, $RSF_{(n+1)/2}=1$; a size of n parts can be equal to each other or not;
- taking the frame difference result when there is only one vehicle moving in camera view, wherein vehicle length $L_i$ is defined by the vehicle length measured by pixels when the rear of the vehicle is inside Pi; wherein if n is an even number, when $n+1>i>n/2$, $RSF_i=L_i/L_{n/2-1}$, and when $n/2>i>0$, $RSF_i=L_{n/2-1}/L_i$; and if n is an odd number, when $n+1>i>(n+1)/2$, $RSF_i=L_i/L_{(n+1)/2}$, and when $(n+1)/2>i>0$, $RSF_i=L_{(n+1)/2}/L_i$.

9. The method of claim 7, wherein the performing of the scale transform for each sub-image comprises:
- dividing each anti-perspective image into n parts ($P_1$, $P_2$ ... $P_n$); wherein when n is an even number, $RSF_{n/2-1}=1$, and when n is an odd number, $RSF_{(n+1)/2}=1$; a size of n parts can be equal to each other or not;
- taking the frame difference result when there is only one vehicle moving in camera view, wherein vehicle length $L_i$ is defined by the vehicle length measured by pixels when the rear of the vehicle is inside Pi; wherein if n is an even number, when $n+1>i>n/2$, $RSF;=L_{n/2-1}$, and when $n/2>i>0$, $RSF_i=L_{n/2-1}/L_i$; and if n is an odd number, when $n+1>i>(n+1)/2$, $RSF_i=L_i/L_{(n+1)/2}$, and when $(n+1)/2>i>0$, $RSF_i=L_{(n+1)/2}/L_i$.

10. The method of claim 2, wherein the performing of the vehicle localization for each vehicle comprises:
- given a vehicle image I, there is a ground truth shape S corresponding to this vehicle image, training t forests to get a feature mapping function $\varphi^t(I,S^{t-1})$ for each tree to generate local features, wherein t indicates that t stages are trained, and n forests are trained (here n forests are equal n experts) in each stage;
- calculating the error of the last stage $\Delta S^t$ from ground truth and previous stage estimated shape $S^{t-1}$, and also defined as the target shape increments $\{\Delta S^t=S-S^{t-1}\}$, wherein the shape error $\Delta S$ is relative to shape-indexed features; the shape-indexed features being used for construction of a binary tree and then local features are generated from the leaves of a binary; and
- training a linear projection matrix $W^t$ to get the feature mapping between the local binary feature and shape error $\Delta S$ by linear regression.

11. The method of claim 4, wherein the performing of the vehicle localization for each vehicle comprises:
- given a vehicle image I, there is a ground truth shape S corresponding to this vehicle image, training t forests to get a feature mapping function $\varphi^t(I,S^{t-1})$ for each tree to generate local features, wherein t indicates that t stages are trained, and n forests are trained (here n forests are equal n experts) in each stage;
- calculating the error of the last stage $\Delta S^t$ from ground truth and previous stage estimated shape $S^{t-1}$, and also defined as the target shape increments $\{\Delta S^t=S-S^{t-1}\}$, wherein the shape error $\Delta S$ is relative to shape-indexed features; the shape-indexed features being used for construction of a binary tree and then local features are generated from the leaves of a binary; and
- training a linear projection matrix $W^t$ to get the feature mapping between the local binary feature and shape error $\Delta S$ by linear regression.

12. The method of claim 3, further comprising recognizing colors of the located vehicle license plates based on images of the located vehicle license plates.

13. The method of claim 4, further comprising recognizing colors of the located vehicle license plates based on images of the located vehicle license plates.

14. An intelligent traffic surveillance system for vehicle management with a perspective view camera generating perspective images of vehicles in a traffic direction, comprising:
- an anti-perspective transform unit to perform an anti-perspective transform on the perspective images, and separating each anti-perspective image into sub-images along one of a radial direction and a tangential direction relative to the traffic direction;
- a scale factor determining unit to determine a scale factor for each sub-image based upon measuring a scale of each vehicle at plural in one image using a frame difference method performing a scale transform for each sub-image using the corresponding scale factors for the sub-image;
- an enhanced anti-perspective transformation unit combining each of the scale transformed sub-images for each vehicle into corresponding enhanced anti-perspective images;
- a vehicle detector performing vehicle detection for each vehicle based a combination of the enhanced anti-perspective images in which detecting is enhanced with an optimized detection box size range determined by the enhanced anti-perspective images; and
- a vehicle tracker performing vehicle tracking for each vehicle based on the combination of the enhanced anti-perspective images in which tracking is enhanced with the optimized detection box size range determined by the enhanced anti-perspective images.

15. The traffic surveillance system of claim 14, further comprising;
- a vehicle localizer performing vehicle localization for each vehicle by integrating each of the detected and/or tracked results from a same one of the vehicles.

16. The traffic surveillance system of claim 15, wherein the vehicle localizer:
- performs landmark localization to localize a vehicle plate area for each vehicle based upon at least one of the detected and tracked results; and
- locates a vehicle license plate around the localized plate area of each vehicle based upon the landmark localization.

17. The traffic surveillance system of claim 16, further comprising a color recognizer recognizing colors of the located vehicle license plates based on images of the located vehicle license plates.

* * * * *